United States Patent
Sundaram et al.

(10) Patent No.: US 8,055,047 B2
(45) Date of Patent: Nov. 8, 2011

(54) POLYP DETECTION USING SMOOTHED SHAPE OPERATORS

(75) Inventors: Padmavathi Sundaram, Palo Alto, CA (US); Sandy A. Napel, Menlo Park, CA (US); Christopher F. Beaulieu, Los Altos, CA (US); Afra J. Zomorodlan, Hanover, NH (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 1059 days.

(21) Appl. No.: 11/893,366

(22) Filed: Aug. 14, 2007

(65) Prior Publication Data

US 2008/0205749 A1  Aug. 28, 2008

Related U.S. Application Data

(60) Provisional application No. 60/837,887, filed on Aug. 14, 2006.

(51) Int. Cl.
*G06K 9/00* (2006.01)

(52) U.S. Cl. ........ 382/131; 382/128; 382/132; 382/154; 382/181; 382/190; 382/195; 382/205

(58) Field of Classification Search .......... 382/128, 382/131, 132, 154, 181, 190, 195, 205
See application file for complete search history.

(56) References Cited

U.S. PATENT DOCUMENTS

| | | | |
|---|---|---|---|
| 6,246,784 B1 * | 6/2001 | Summers et al. | 382/128 |
| 6,345,112 B1 | 2/2002 | Summers et al. | |
| 7,043,064 B2 | 5/2006 | Paik et al. | |
| 2004/0252870 A1 * | 12/2004 | Reeves et al. | 382/128 |
| 2005/0111713 A1 | 5/2005 | Jerebko | |
| 2005/0196041 A1 | 9/2005 | Jerebko et al. | |
| 2006/0079761 A1 | 4/2006 | Tu et al. | |

FOREIGN PATENT DOCUMENTS

WO  WO 00/52629  9/2000

OTHER PUBLICATIONS

Szymon Rusinkiewicz, Estimating curvatures and their derivatives on triangle meshes, in 3D Data Processing, Visualization and Transmission, 2004. 3DPVT 2004. Proceedings 2nd International Symposium on, 2004,pp. 4886-493.

Adam Huang et al. Surface curvature estimation for automatic colonic polyp detection. 2005 393-402 SPIE vol. 5746 (SPIE, Bellingham, WA, 2005).

* cited by examiner

*Primary Examiner* — Bhavesh Mehta
*Assistant Examiner* — Daniel Zeilberger
(74) *Attorney, Agent, or Firm* — Lumen Patent Firm

(57) ABSTRACT

Improved surface feature recognition in CT images is provided by extracting a triangulated mesh representation of the surface of interest. Shape operators are computed at each vertex of the mesh from finite differences of vertex normals. The shape operators at each vertex are smoothed according to an iterative weighted averaging procedure. Principal curvatures at each vertex are computed from the smoothed shape operators. Vertices are marked as maxima and/or minima according to the signs of the principal curvatures. Vertices marked as having the same feature type are clustered together by adjacency on the mesh to provide candidate patches. Feature scores are computed for each candidate patch and the scores are provided as output to a user or for further processing.

14 Claims, 6 Drawing Sheets

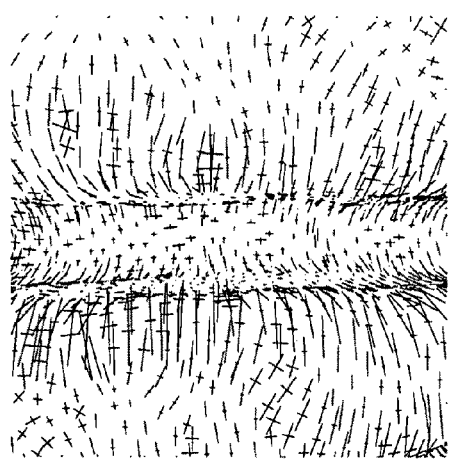
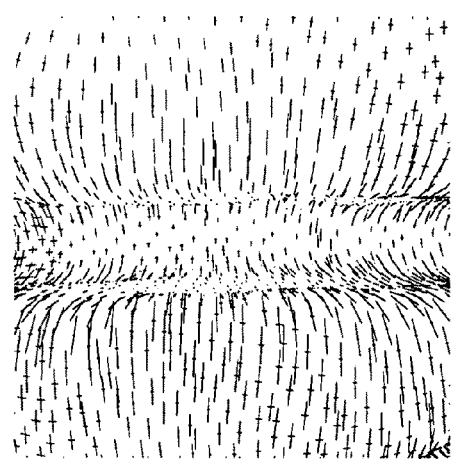
Fig. 6a            Fig. 6b
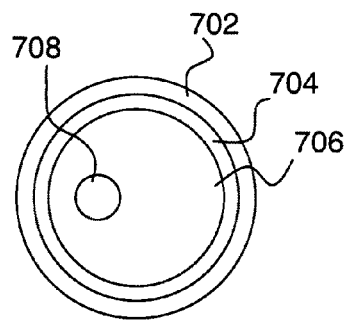
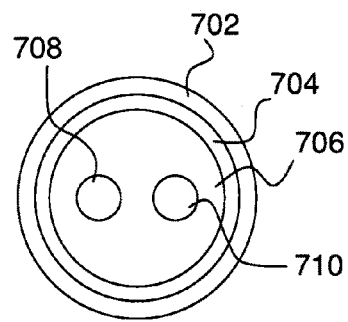
Fig. 7a            Fig. 7b

POLYP DETECTION USING SMOOTHED SHAPE OPERATORS

CROSS REFERENCE TO RELATED APPLICATIONS

This application claims the benefit of U.S. provisional patent application 60/837,887, filed on Aug. 14, 2006, entitled "Polyp Detection using Smoothed Shape Operators", and hereby incorporated by reference in its entirety.

GOVERNMENT SPONSORSHIP

Federally-Sponsored Research or Development

This invention was made with Government support under contract HR0011-05-1-0007 awarded by the Defense Advanced Research Projects Agency and contracts GM072970 and CA072023 awarded by the National Institutes of Health. The Government has certain rights in this invention.

FIELD OF THE INVENTION

This invention relates to automatic detection of features in three dimensional image data.

BACKGROUND

Automatic feature recognition in image processing has a large number of applications, and has been extensively investigated for some time. For example, as medical imaging techniques become more widely used, there is a corresponding need for automatic analysis of medical image data. This need is most pressing in applications which generate large amounts of data for analysis. For example, Computed Tomographic Colonoscopy (CTC) can provide thousands of CT images, each of which needs interpretation by a radiologist to locate polyps or other abnormal features. Colon polyps are small, inward-facing protrusions on the colon surface, and are considered to be precursors to colon cancer. Accordingly, methods for providing automatic detection of polyp features in CTC data have been investigated.

One approach is based on 3-D pattern recognition, where a system identifies a candidate location for analysis, then computes a probability measure for the candidate location to be a polyp. The computation of the probability measure is based on prior training of the system with a training set of known polyps. Such an approach is considered in US2006/0079761. However, most approaches for automatic polyp detection rely on computation of surface curvature information from the given 3-D data, which can be done in various ways.

For example, in U.S. Pat. No. 7,043,064, polyps are identified by computing surface normals and looking for intersections (or overlaps) of the surface normals. This surface normal overlap (SNO) method is based on the observation that surface normals from a polyp will tend to overlap or intersect, while surface normals from non-polyp features (e.g., haustral folds) do not tend to overlap or intersect.

Another approach for determining curvature is based on computing curvatures directly from 3-D image data (e.g., as described in US 2005/0196041, US 2005/0111713, and U.S. Pat. No. 6,345,112. In such approaches, voxels in the 3-D image belonging to the surface are identified by a surface locating algorithm, then the curvatures at the surface voxels are computed directly from the 3-D data.

Yet another approach for determining curvature is surface patch fitting. In these approaches, a surface is identified in the 3-D data, the surface is divided into patches, and a simple functional fit is performed to each surface patch. The curvature for each patch is determined from the fitted function for that patch. Surface patch fitting is considered in U.S. Pat. No. 6,345,112, PCT application PCT/US00/05596, and in an article by Huang et al. entitled "Surface Curvature estimation for automatic colonic polyp detection", Proc. SPIE 5746, *Medical Imaging* 2005, ed. Amini and Manduca, pp. 393-402, 2005).

For all of these approaches, some form of smoothing is typically required to obtain useful results in practice, since raw CT data tends to be noisy, and computing curvature from CT data tends to amplify noise because the curvature is a second derivative of the data. However, such smoothing can undesirably introduce errors and anomalies into the reported curvature results. For example, smoothing the 3-D image can result in the curvature estimates being corrupted by contributions from nearby structures in the data that are irrelevant.

Accordingly, it would be an advance in the art to provide surface feature recognition for 3-D image data having improved performance and reduced corruption during curvature computation.

SUMMARY

Improved surface feature recognition in CT images is provided by extracting a triangulated mesh representation of the surface of interest. Shape operators are computed at each vertex of the mesh from finite differences of vertex normals. The shape operators at each vertex are smoothed according to an iterative weighted averaging procedure. Principal curvatures at each vertex are computed from the smoothed shape operators. Vertices are marked as maxima and/or minima according to the signs of the principal curvatures. Vertices marked as having the same feature type are clustered together by adjacency on the mesh to provide candidate patches. Feature scores are computed for each candidate patch and the scores are provided as output to a user or for further processing.

This smoothed shape operator (SSO) method fundamentally differs from methods which directly process the 3-D data. In the SSO method, once the mesh is obtained, all further computations pertain exclusively to the mesh. Therefore, the SSO method is immune to corruption of curvature estimates during image processing (e.g., from smoothing of image data with large kernels) due to features in the 3D image that are irrelevant because they are not on the surface of interest. This immunity is a significant advantage of the SSO method compared to conventional 3D image processing approaches for locating surface features, which are not immune to such corruption from unrelated structures.

Another significant aspect of the SSO method is that it uses geometry as a prior by directly smoothing shape operators on the mesh, as opposed to smoothing other quantities, such as mesh vertex positions or computed scalar curvatures. A further significant aspect of some embodiments of the SSO method is the use of Gaussian curvature to assign scores to polyp candidate patches.

BRIEF DESCRIPTION OF THE DRAWINGS

FIGS. 6a-b show examples of principal curvatures computed from unsmoothed and smoothed shape operators.

FIGS. 7a-b schematically show two phantom configurations.

DETAILED DESCRIPTION

Figure 1:
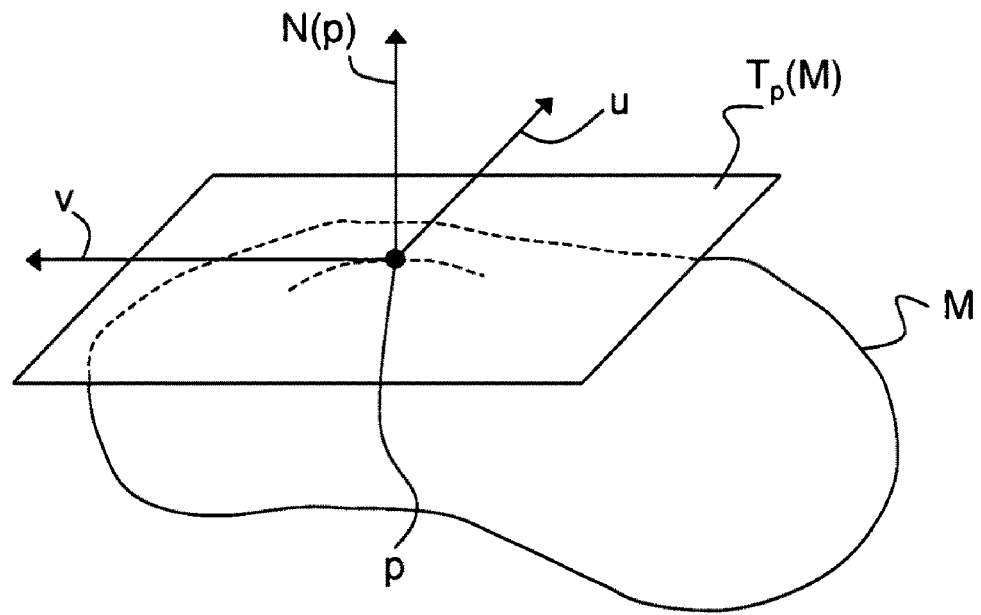
FIG. 1 shows geometry for defining the shape operator.

To better appreciate the present invention, it is helpful to briefly review the definition and some basic properties of the shape operator of differential geometry. Since the details required for mathematical precision are well known in the art, and are also not critical for practicing the invention, the following description is intuitive as opposed to being mathematically rigorous. FIG. 1 shows geometry for defining the shape operator on a smooth surface M. At any point p on M, a tangent plane $T_p(M)$ is the set of all tangent vectors to M at p. The surface normal $N(p)$ at p is a vector that is perpendicular to the tangent plane $T_p(M)$. Thus each point p of M has an associated surface normal vector $N(p)$.

The set of all normal vectors of M is the normal vector field N. The shape operator at a point on the surface is the covariant derivative of the normal vector field with respect to a tangent vector to the surface at that point. It is useful for mathematically describing surface shape, since it is a measure of how the normal vector field N is changing. It maps one tangent vector to another, hence it is an operator. The shape operator at p in tangent direction r (i.e. $S_p(r)$) is defined as follows:

$$S_p(r) = -\nabla_r N(p) \equiv -N'(p+tr)|_{t=0} \quad (1)$$

where the prime indicates differentiation with respect to the scalar parameter t, and r is any vector in $T_p(M)$. Here the customary sign convention is followed, where the shape operator is defined to be the negative of the covariant derivative of $N(p)$. Embodiments of the invention can also be practiced with the opposite sign convention taken in Eq. 1 (i.e., with either possible shape operator sign convention). The shape operator is linear because it is a derivative. It is symmetric because relations between neighboring points on the surface are reciprocal. The shape operator is often referred to as the second fundamental form or the Weingarten endomorphism in the literature.

Curvature can readily be computed from the shape operator. More specifically, $k(r)=r \cdot S_p(r)$ is the normal curvature of M in direction r. The plane containing $N(p)$ and r intersects surface M at a curve on M (e.g., if r=v on FIG. 1, this curve is the dotted line passing through p). The curvature of this intersection curve at p (i.e., the inverse of the radius of the osculating circle) is $k(r)$. The maximum and minimum values of $k(r)$ as r varies over all possible directions in $T_p(M)$ are the principal curvatures of M at p, $k_1(p)$ and $k_2(p)$ respectively. Thus $k_1(p) \geq k_2(p)$ by definition. The directions in which these extreme values occur are the principal vectors of M at p, denoted $e_1$ and $e_2$ respectively. When $k_1 \neq k_2$, the principal directions are orthogonal eigenvectors of the shape operator, and the principal curvatures are the corresponding eigenvalues of the shape operator. The Gaussian curvature $K(p)$ of M at p is given by $K(p)=k_1(p)k_2(p)$.

The behavior of surface M at p can be classified according to the signs of the principal curvatures of M at p. More specifically, if p is placed at the origin of a coordinate system having $T_p(M)$ in the x-y plane and having $e_1$ aligned with the x-axis and the z-axis along $N(p)$, then M is approximately coincident with $f(x,y)=(k_1(p)x^2+k_2(p)y^2)/2$ near p. If $k_1>0$ and $k_2>0$, the surface near p is a pit having a local minimum of surface elevation at p. If $k_1<0$ and $k_2<0$, the surface near p is a peak having a local maximum of surface elevation at p. If $k_1>0$ and $k_2<0$, M has a saddle point at p.

For a colonic surface oriented such that surface normals point inward to the colon lumen, tips of polyps will be peak-like according to the above classification (i.e., have both principal curvatures<0). Alternatively, a surface orientation sign convention could be chosen such that surface normals point away from the colon lumen, in which case tips of polyps will have both principal curvatures>0.

The following description is based on the convention where surface normals of a colonic surface are taken to point toward the colon lumen, and is accordingly expressed in terms of identifying peak-like features. Embodiments of the invention can be practiced according to either surface orientation sign convention, and are suitable for identifying pit-like and/or peak-like features on a surface.

For explicit calculations, it is helpful to introduce a suitable coordinate system. For example, coordinate axes u and v in $T_p(M)$ can be selected in FIG. 1. The shape operator $S_p(r)$ has a corresponding matrix representation $M_p$ in the u-v coordinate system, where the matrix $M_p$ is given by:

$$M_p = \begin{pmatrix} \frac{\partial N}{\partial u} \cdot u & \frac{\partial N}{\partial v} \cdot u \\ \frac{\partial N}{\partial u} \cdot v & \frac{\partial N}{\partial v} \cdot v \end{pmatrix}. \quad (2)$$

Matrix representations of the shape operator with respect to a specific coordinate system are useful for explicit calculations, and as is well-known in the art, intrinsic surface properties (e.g., principal curvatures) are coordinate-independent, so the results of interest do not depend on which coordinate system is selected. Accordingly, coordinate systems can be selected for convenience. Furthermore, because the shape operator is a linear operator, the transformation of its matrix representations from one coordinate system to any other coordinate system follow the ordinary rules of linear algebra, which are well-known in the art.

In an exemplary embodiment of the invention, the following steps are carried out in sequence to implement colon polyp detection using smoothed shape operators (SSO), with a voxelized colon CT image as input:
1) Segment colon lumen,
2) Extract colon surface as a triangulated mesh,
3) Compute the shape operators at mesh vertices,
4) Smooth the shape operators,
5) Calculate the principal curvatures at mesh vertices,
6) Detect peak vertices,
7) Cluster peak vertices into candidate patches,
8) Compute peak scores for the candidate patches,
9) Report peak scores as an output.

The starting point for this example is 3-D volumetric image data in the form of a voxelized volume obtained by computed tomographic (CT) scanning and reconstruction. Methods for performing such CT scanning and reconstruction to provide voxelized 3-D data are well known in the art. Suitable methods for segmenting the colon lumen (step 1) are also well known in the art. For example, seeded 3D region filling can be employed, where a user selects a seed inside the colon lumen and the algorithm labels the connected region containing the seed and voxels having intensity less than −700 HU. Multiple seed points can be employed if collapsed segments isolate portions of the lumen from each other.

Methods for extracting the colon surface as a triangulated mesh (step 2) are also well known in the art. For example, the marching cubes algorithm can be employed. The output of step 2 is a triangulated mesh representation of the inner colon surface, e.g., as shown by example on FIG. 4.

Figure 2:
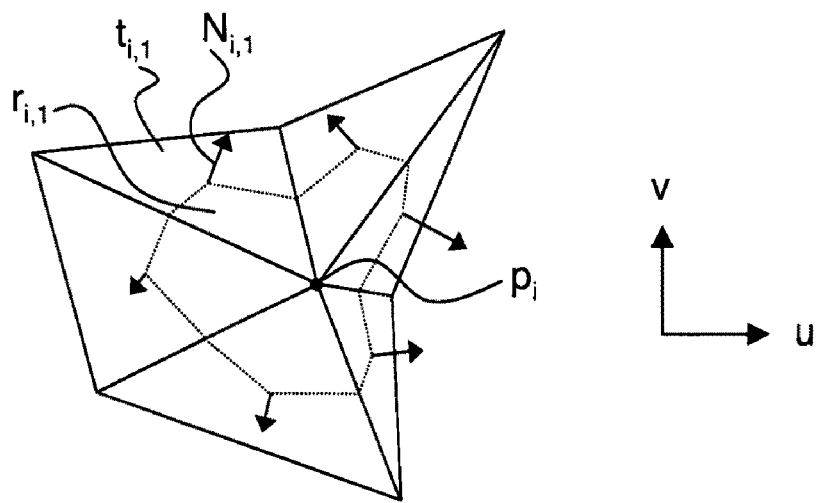
FIG. 2 shows a vertex neighborhood of a triangulated mesh.
Figure 4:
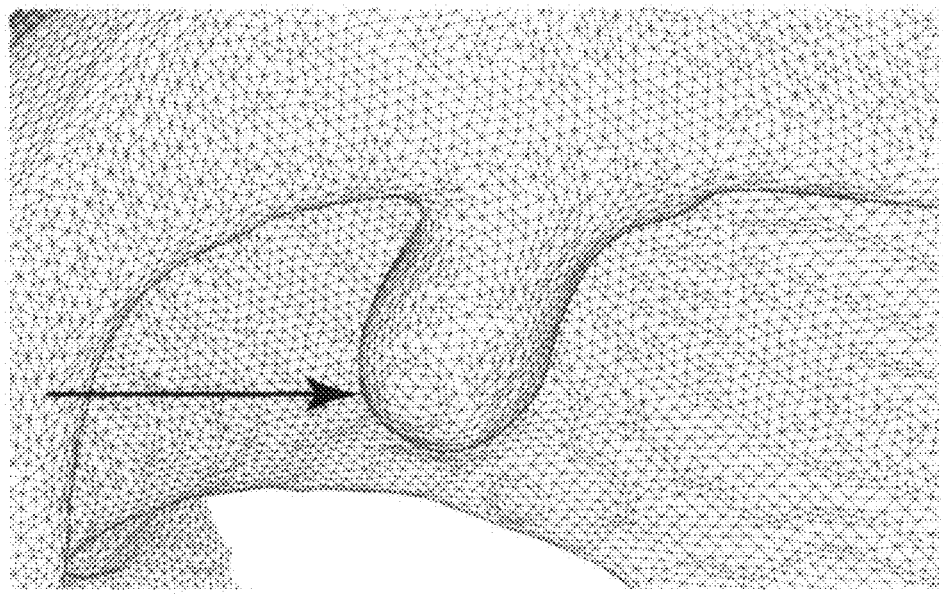
FIG. 4 shows an example of a triangulated mesh representation of the inner surface of a colon.

Construction of shape operators at mesh vertices (step 3 above) is a key aspect of the invention. FIG. 2 shows a vertex $p_i$ of a triangulated mesh, together with the adjacent triangles. Notationally, it is convenient to define $\{t_{i,j}\}$ to be the set of triangles adjacent to vertex $p_i$. Each triangle $t_{i,j}$ has an area $A_{i,j}$, and has a corresponding triangle surface normal $N_{i,j}$, perpendicular to $t_{i,j}$. Each triangle $t_{i,j}$ also has a region $r_{i,j}$ closer to vertex $p_i$ than to any other vertex of $t_{i,j}$, and each region $r_{i,j}$ has area $R_{i,j}$. The region enclosed by the dotted line on FIG. 2 is referred to as the mixed Voronoi region of vertex $p_i$, and it has area $R_i$. FIG. 2 shows labels for $t_{i,1}$, $N_{i,1}$, and $r_{i,1}$, and labels for the other five triangles of this example are not shown, for clarity. The number of triangles adjacent to a vertex can differ from vertex to vertex in the mesh. Triangles $t_{i,j}$ are typically not in the same plane, as seen in the example of FIG. 4, and as schematically indicated on FIG. 2.

Briefly, step 3 of computing shape operators at the mesh vertices includes:
a) computing surface normals at each mesh vertex,
b) computing shape operators at each mesh triangle,
c) computing shape operators at each mesh vertex.

Vertex mesh surface normals are computed as weighted averages of the normals $N_{i,j}$ of the adjacent triangles $t_{i,j}$. A weighted average of data $x_j$ with weights $w_j$ is the sum of $w_j x_j$ divided by the sum of $w_j$. Since the weighted average is normalized by the sum of the $w_j$, scaling all the $w_j$ by the same factor does not affect the result. Accordingly, equations for weights given in the following description should be understood as providing the relative weighting (i.e., the j dependence of the $w_j$), because multiplying the weights by a factor independent of j does not affect the average. Various weighting schemes for this averaging are known, and any of these can be employed in practicing the invention. Preferably, the relative weights $W_{Ni,j}$ for computing triangle normals from vertex normals are given by $$W_{Ni,j} = \frac{A_{i,j}}{L_{i,j,1}^2 L_{i,j,2}^2}, \quad (3)$$

where $L_{i,j,1}$ and $L_{i,j,2}$ are the lengths of the two edges of $t_{i,j}$ that touch $p_i$. All of the surface normals of the triangles should be expressed in a single consistent coordinate system prior to performing the weighted averaging. Since the ordinary rules for coordinate transformations of vectors are applicable to surface normals, these transformations are well known and need not be described here.

Figure 3:
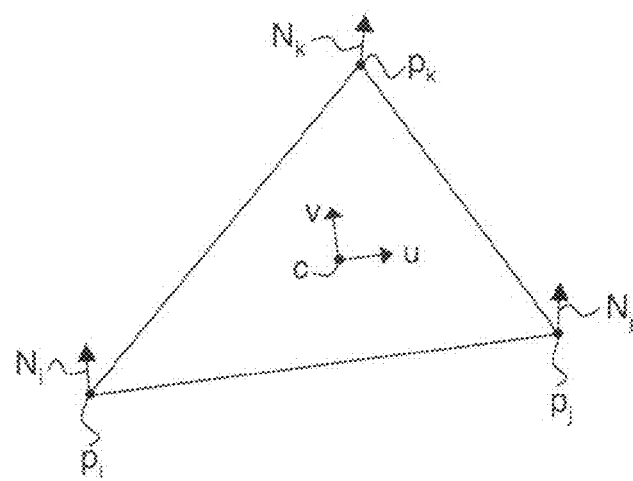
FIG. 3 shows a triangle of a triangulated mesh.

FIG. 3 shows geometry for computing shape operators at each mesh triangle (step b above). The triangle of FIG. 3 has vertices $p_i$, $p_j$, and $p_k$, and corresponding vertex normals $N_i$, $N_j$, and $N_k$. It is convenient to define coordinate axes u and v in the plane of the triangle. The origin of the coordinates can be set at c, the centroid of the triangle, although practice of the invention is not dependent on the choice of coordinate origin.

A finite difference expansion of Eq. 2 as applied to the geometry and coordinate system of FIG. 3 gives the following equations:

$$M_c \begin{pmatrix} (p_j - p_i) \cdot u \\ (p_j - p_i) \cdot v \end{pmatrix} = \begin{pmatrix} (N_i - N_j) \cdot u \\ (N_i - N_j) \cdot v \end{pmatrix} \quad (4)$$

$$M_c \begin{pmatrix} (p_k - p_j) \cdot u \\ (p_k - p_j) \cdot v \end{pmatrix} = \begin{pmatrix} (N_j - N_k) \cdot u \\ (N_j - N_k) \cdot v \end{pmatrix},$$

$$M_c \begin{pmatrix} (p_i - p_k) \cdot u \\ (p_i - p_k) \cdot v \end{pmatrix} = \begin{pmatrix} (N_k - N_i) \cdot u \\ (N_k - N_i) \cdot v \end{pmatrix}$$

where $M_c$ is the 2×2 matrix representation of the triangle shape operator at c in the u-v coordinate system of the triangle. Eqs. 4 is a system of linear equations that can be solved for the matrix elements of $M_c$. Since $M_c$ is symmetric, there are three independent matrix elements. The system of Eqs. 4 is over-determined, since there are six equations for three unknowns. Therefore, an exact solution to Eqs. 4 usually does not exist. Instead, an approximate solution is calculated, e.g., by well-known least squares methods for over-determined systems of linear equations. The resulting $M_c$ minimizes the squared error in Eqs. 4, without necessarily providing an exact solution. The matrix $M_c$ as computed in this manner is taken to represent the shape operator of the triangle in the triangle coordinate system.

Step c above is to compute shape operators at each mesh vertex. The vertex shape operators are computed as weighted averages of the shape operators of the adjacent triangles. Various weighting schemes have been employed in practice, and the invention can be practiced with any of these. Preferably, the relative weights $W_{Mi,j}$ for shape operator averaging are given by $W_{Mi,j} = R_{i,j}$. All of the shape operators of the triangles should be expressed in a single consistent coordinate system prior to performing the weighted averaging. Since the ordinary rules for coordinate transformations of rank 2 tensors are applicable to shape operators, these transformations are well known and need not be described here.

Step 4 of smoothing the shape operators is another key aspect of the invention. Smoothing is particularly important in connection with screening for colon polyps, because CT image data tends to be noisy, and the differentiation inherent in computing curvature tends to amplify noise. In this example, the shape operators at the mesh vertices are smoothed by an iterative weighted averaging of the shape operator at a vertex with the shape operators at adjacent vertices.

At step l of the averaging, relative weights for averaging at vertex $p_i$ are given by $$w_{ij,l} = R_j (N_i \cdot N_j) \frac{\exp(-\|p_i - p_j\|^2 / 2\sigma_l^2)}{\sigma_l^2}, \quad (5)$$

where $\sigma_l$ is a smoothing parameter that increases from one iteration to the next. This weight uses a Gaussian based on the distance between $p_i$ and $p_j$, as well as the area of the mixed Voronoi region of $p_j$. The dot product of the vertex normals $N_i$ and $N_j$ is included to decrease the contribution of vertices having substantially different normals than $N_i$.

Iteration can proceed according to $$\sigma_{l+1} = 1.1\sigma_l \quad (6)$$

$$S_{i,l+1} = S_{i,l} + \frac{\sum_j w_{ij,l} S_{j,l}}{\sum_j w_{ij,l}},$$

where $S_{i,l}$ is the smoothed shape operator at vertex $p_i$ at the lth iteration, the sum on j runs over vertices adjacent to vertex $p_i$, and the shape operators $S_{i,l}$ and $S_{j,l}$ are represented in a single consistent coordinate system prior to computing $S_{i,l+1}$.

The iteration can be initialized by setting $\sigma_0$ about equal to 0.05 mm and by setting $S_{i,0}$ equal to the output of step 3 (i.e., the finite difference shape operators at the vertices) and terminated when $\sigma_l$ is greater than about 0.5 mm. For this example, 0.5 mm was selected as the ending value because 0.5 mm is the median edge length of the meshes of this example. Specific values are given for starting and ending $\sigma$, as well as for the per iteration scaling factor $\sigma_{l+1}/\sigma_l$, for illustrative purposes. Practice of embodiments of the invention is not limited to these exemplary values. For colon polyp detection, preferably $\sigma_{end}$ is about equal to the median edge length of the mesh, $\sigma_{start}$ is about 0.1 $\sigma_{end}$, and $1.05 < \sigma_{l+1}/\sigma_l < 1.15$. For other applications, suitable numerical ranges for these smoothing parameters can be readily determined.

Step 5 is to compute the principal curvatures at each vertex of the mesh from the smoothed shape operators at each vertex. Methods for performing this computation are well known. For example, an eigenvalue decomposition of the matrix representation of the smoothed shape operator can be employed.

Step 6 is to mark each vertex having negative principal curvatures as a peak vertex. This step is convention-dependent as described above. More generally, one can select the feature types of interest to be local maxima and/or local minima. Features having principal curvatures consistent with the selected feature types can be marked accordingly.

Step 7 is to cluster vertices marked as having the same feature type by adjacency on the triangulated mesh to provide a set of candidate patches.

Step 8 is to compute a feature score for each candidate patch. For colon polyp detection, a peak score is given by $$G(P) = \left(\sum_{p_i \in P} K_i R_i\right) \left(\min_{p_i \in P} k_2(p_i)\right), \quad (7)$$

where P is a set of vertices in a candidate patch and $K_i$ is the Gaussian curvature at vertex $p_i$. The first factor in Eq. 7 is an area-weighted discretized integral of Gaussian curvature, which favors large polyploid candidate patches. The second factor in Eq. 7 tends to favor smaller polyps over large slightly bumpy patches of haustral folds. This helps reduce false positives due to folds or features on folds.

Step 9 is to provide the candidate patch feature scores as an output. Optionally, this output can be sorted according to score.

FIG. 4 shows an example of a triangulated mesh representation of the inner surface of a colon. The arrow points to a polyp.

The above-described screening algorithm has been tested with a database of 35 anonymized CT colonography exams. The database includes 27 positive cases (i.e., having at least one polyp) and 8 negative cases (i.e., having no polyps). For each patient in this database, optical colonoscopy (OC) was performed immediately after the CT scan was performed. A radiologist with 10 years experience in interpretation of CTC exams recorded the locations and sizes of the visible polyps in the CTC images with reference to the OC results. The sizes of the polyps were measured by the radiologist from the CT images using a multi-planar caliper tool. The radiologist reported 122 polyps of various sizes. This list of polyps was used as the reference for evaluating automatic recognition of polyps from CT images in this database. No computer-aided detection (CAD) results were employed in generating this reference (i.e., the radiologist was blinded with respect to the CAD results).

The above-described SSO peak detection algorithm was performed for each of the 35 cases in the database. Typical computation times for iterative smoothing of the shape operators were on the order of 100 seconds per case, and creation of the sorted list of candidate patches added approximately 40 milliseconds per case. The performance of the SSO method was evaluated by comparing its results to the reference results. Since the reference results were expressed as voxel locations, and the SSO outputs were lists of surface patches, each patch was represented by its centroid for comparison purposes. Automatic scoring was employed, where each CAD hit was labeled as a true positive (TP) if it was located within one-half of the polyp's recorded size away from the polyp's recorded location, and as a false positive (FP) otherwise. In case of multiple CAD hits being labeled as TPs for the same polyp, only the highest scoring CAD hit was considered.

The output of a CAD algorithm is typically a list of image location sorted by score. Therefore, varying the score threshold above which a positive is declared and below which a negative is declared, alters the number of TPs and FPs. Free-response receiver operating characteristic (FROC) curves capture the trade-off between sensitivity (true positive fraction) and the number of FPs per case as the score threshold is varied. Thus score threshold is a parameter of the FROC curve. Ideally, the FROC curve would be a step function, achieving a sensitivity of 100% at 0 FP per case. The closer the FROC curve of an algorithm approaches this step-function ideal, the better it performs.

Figure 5A:
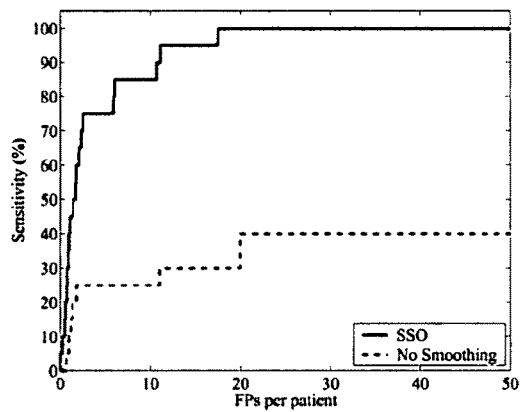
FIGS. 5a-d show sensitivity results for colon polyp recognition with and without smoothing of the shape operators.
Figure 5B:
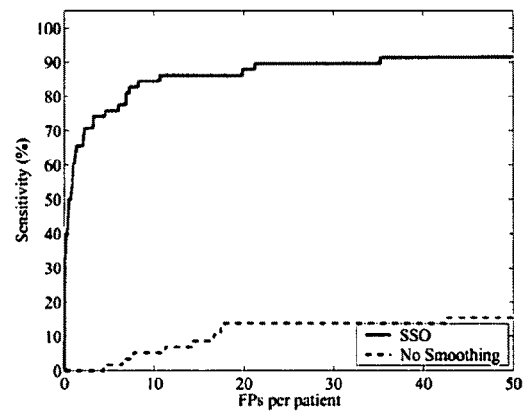
Figure 5C:
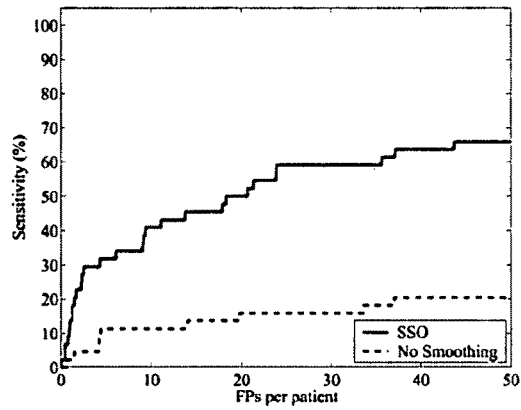
Figure 5D:
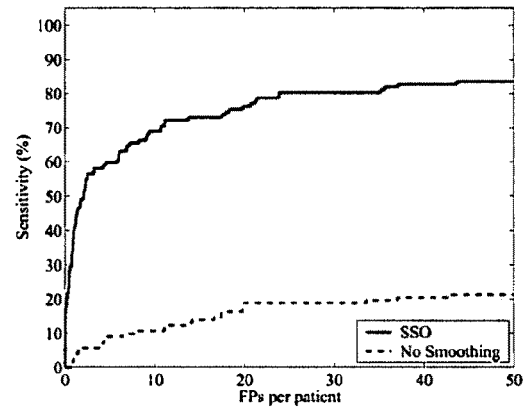

FIGS. 5a-d show FROC curves comparing the performance of the above-described SSO algorithm to a "no-smoothing" algorithm that is the same as SSO except that smoothing of the shape operators is omitted. FIG. 5a shows results pertaining to the 20 large (i.e., $\geq$10 mm) polyps in the database. FIG. 5b shows results pertaining to the 58 intermediate sized polyps (i.e., $\geq$5 mm and <10 mm) in the database. FIG. 5c shows results pertaining to the 44 small (i.e., <5 mm) polyps in the database. FIG. 5d shows results pertaining to all 122 polyps in the database. Smoothing the shape operators significantly improves performance for all polyp size ranges to a statistically significant degree. For polyps larger than 10 mm, smoothing the shape operators triples the sensitivity at low FP rates $\leq$5 per case. Similar results are observed for the other polyp size ranges.

FIGS. 6a-b show an example of the effect of smoothing the shape operators on computed curvature results. In these plots, scaled principal vectors $k_1 e_1$ and $k_2 e_2$ are shown at each vertex. These curvatures are computed from the vertex shape operators as described above. The section being shown here is a portion of a haustral fold. FIG. 6a shows the curvatures computed from un-smoothed shape operators, while FIG. 6b shows curvatures computed from the corresponding smoothed shape operators. The effect of smoothing in reducing noise is apparent.

The effect of smoothing on the SSO algorithm has been compared to the effect of smoothing on a CAD algorithm based on computation of curvature directly from 3-D image data. This comparison was performed by constructing mathematical phantoms as schematically shown on FIGS. 7a-b. The phantoms had a 6 mm thick outer cylinder 702 of soft tissue-equivalent density surrounding a 6 mm thick inner cylinder 704 of fat-equivalent density surrounding a lumen 706 of air having a radius of 18 mm. Both cylinders were 24 mm long. In the phantom of FIG. 7a, a single tissue-equivalent density ellipsoid 708 with half axes of 5 mm, 5 mm, and 7 mm, with the long axis of the ellipsoid aligned to the axis of the cylinders 702 and 704, was disposed in lumen 706. In the phantom of FIG. 7b, a second ellipsoid 710, having the same dimensions and orientation as ellipsoid 708, is disposed in lumen 706. The center to center spacing of ellipsoids 708 and 710 was 12.4 mm, so their surfaces came as close as 2.4 mm to each other.

Helical CT scans of the two phantoms were simulated using CT simulation software, with the longitudinal axis of the simulated scan aligned with the cylinder axis of the phantoms. Poisson noise was added to the projection data in order to match the noise in a typical 110 mA abdominal acquisition. Curvatures were estimated on the ellipsoid equator from the simulated CT scans using the following two methods: method 1, where curvature is estimated by convolving the image volume with derivative-of-Gaussian kernels; and method 2, where curvature is estimated according to the SSO method as described above.

For method 1, 3D Deriche filters were employed to compute partial derivates of image data. The degree of smoothing of the first and second order derivatives is controlled by parameters $\alpha_1$ and $\alpha_2$ respectively. A lower value of $\alpha_1$ or $\alpha_2$ corresponds to a wider Gaussian kernel with higher standard deviation. For these computations, $\alpha_1$ was fixed at 0.7 (equivalent $\sigma$=2.03 mm), while two settings of $\alpha_2$ were employed: 0.7 and 0.25 (equivalent $\sigma$=2.03 mm and 6.11 mm respectively).

For method 2, the SSO method as described above was employed. Curvatures were recorded at two values of the smoothing parameter $\sigma_t$ of Eq. 5: 0.27 mm and 0.5 mm.

Figure 8A:
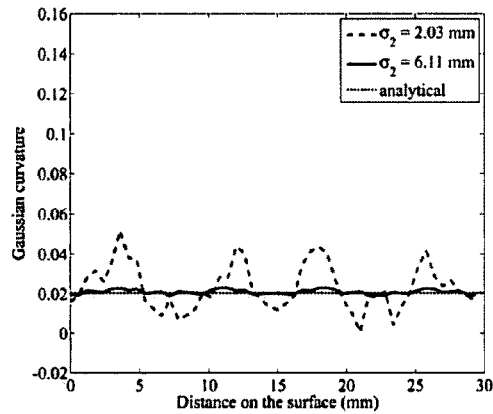
FIGS. 8a-d show curvatures calculated for the phantom configurations of FIGS. 7a-b.
Figure 8B:
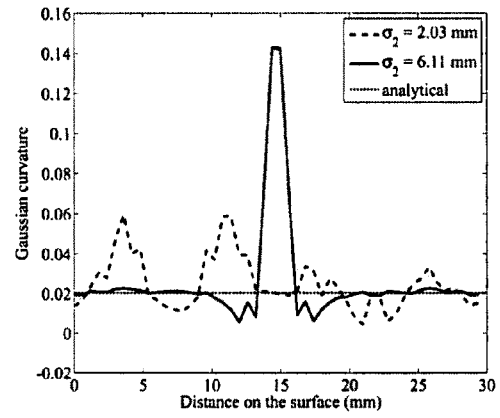

FIGS. 8a and 8b shows results for method 1 applied to the phantoms of FIGS. 7a and 7b respectively. The noteworthy feature of these results is that increasing the smoothing for method 1 improves the results on FIG. 8a (one ellipsoid), but degrades the results on FIG. 8b (two ellipsoids). The reason for this undesirable result is that smoothing in three dimensions (as in method 1), can cause the smoothed estimate to include contributions from image structures that are close in terms of Euclidean distance, but distant in terms of geodesic distance (distance measured along the surface). In this example, the corrupting feature is the second ellipsoid. Smoothing an image containing two ellipsoids can cause blurring of the two ellipsoids together. Note that the equatorial path for which curvature is computed in this example includes the point of minimum separation between the two ellipsoids.

Figure 8C:
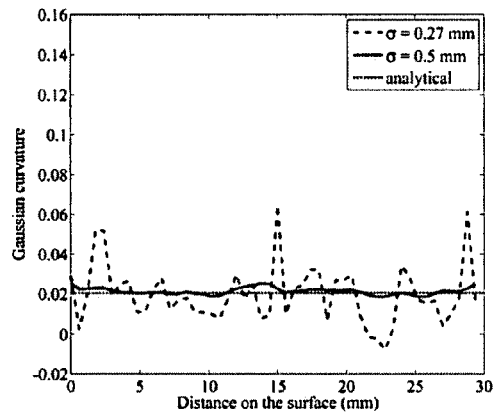
Figure 8D:
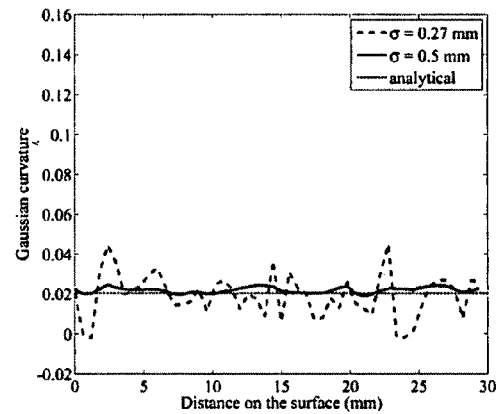

FIGS. 8c and 8d shows results for method 2 applied to the phantoms of FIGS. 7a and 7b respectively. Here the noteworthy feature is the complete absence of any apparent corruption from the nearby, but irrelevant, ellipsoid in the results of FIG. 8d (two ellipsoids). This example highlights a significant advantage of the SSO method, namely its immunity to the presence of nearby but irrelevant image structures. In the SSO method, once a triangulated mesh is computed to represent the surface of interest, all further computations and smoothing pertain exclusively to the triangulated mesh. Therefore, the SSO method does not generate smoothing-induced corruption from nearby irrelevant image features, as demonstrated in this example. This advantage is especially important for colon imaging, since the colon is a complex structure exhibiting nearby distal loops and frequently containing other organs in its images.

FIGS. 9a-d show FROC curves comparing the performance of the above-described SSO algorithm to an earlier-reported surface normal overlap (SNO) method. The SNO method was chosen for this comparison because FROC curves for the SNO method were available from the above-described database of CT images. Thus two different algorithms (SSO and SNO) were applied to the same images and scored according to the same references, thereby simplifying interpretation of the comparison.

Figure 9A:
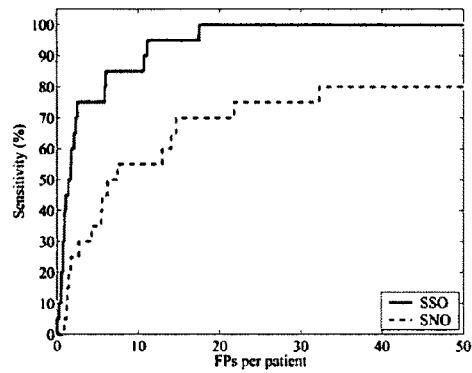
FIGS. 9a-d show sensitivity results for colon polyp recognition for the smoothed shape operator method compared to the surface normal overlap method.
Figure 9B:
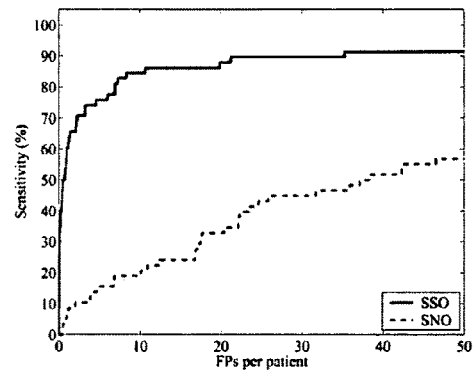
Figure 9C:
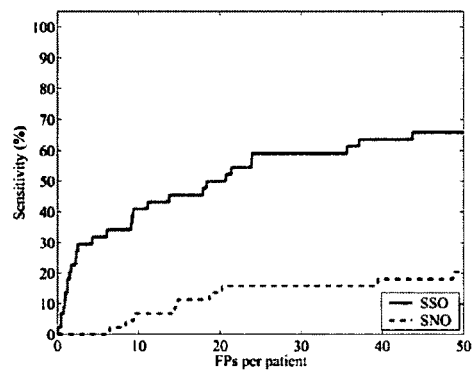
Figure 9D:
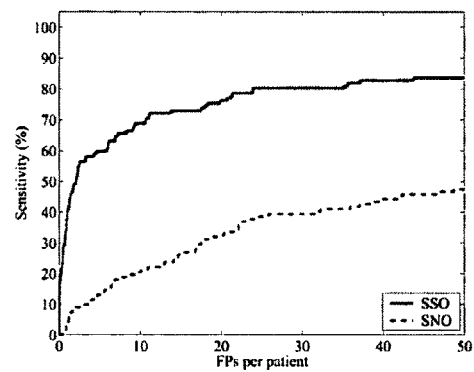

FIG. 9a shows results pertaining to the 20 large (i.e., $\geq$10 mm) polyps in the database. FIG. 9b shows results pertaining to the 58 intermediate polyps (i.e., $\geq$5 mm and <10 mm) in the database. FIG. 9c shows results pertaining to the 44 small (i.e., <5 mm) polyps in the database. FIG. 9d shows results pertaining to all 122 polyps in the database.

At a FP rate of 5 per case, and for polyps larger than 10 mm, SSO achieved a sensitivity of 75%, while the SNO method had a sensitivity of 35%. At this FP rate, the performance difference of the two methods was found to be statistically significant. At a FP rate of 25 per case, and for polyps larger than 10 mm, SSO and SNO achieved sensitivities of 100% and 75% respectively. Here the statistical significance of this sensitivity difference was found to be marginal.

For all other cases, at FP rates of 5 and 25 per case, the SSO method outperformed the SNO method to a statistically significant degree. Therefore, for 5 to 10 mm polyps, and for polyps smaller than 5 mm, the SSO method clearly outperformed the SNO method at all FP rates. Also, overall, the SSO method was found to outperform the SNO method at all FP rates, performing 4 times better at low FP rates, and 2 times as well at high FP rates.

The SSO method as described above can be employed as either a first reader or a second reader in practice. As a first reader, the SSO method can be employed to provide a radiologist with an initial list of candidate locations to evaluate. Alternatively, a radiologist can consult the SSO method as a second reader to improve diagnostic confidence.

For polyps larger than 10 mm, the SSO method provided a sensitivity of 100% at 17.5 FP per case. If an average of 1 polyp per case is assumed, the algorithm could present the radiologist with a sorted list of 18 candidate patches, allowing 100% sensitivity to be achieved without ever looking at the complete case. This could be done very quickly compared to sequential radiologist reading of thousands of images. Thus, in this size range, the SSO method can act as an efficient first reader.

For polyps in the 5 to 10 mm range, the SSO method provided a sensitivity of about 90% at about 21 FP per case. This sensitivity is comparable to the best reported radiologist sensitivities in this size range. If an average of 2 polyps per case is assumed, the algorithm could present the radiologist with a sorted list of 21 candidate patches corresponding to a 90% sensitivity. This makes for an efficient second reader.

The invention claimed is:

1. A method for automatic recognition of one or more surface features in 3-D volumetric image data, the method comprising:
obtaining 3-D volumetric image data from a computed tomography apparatus;
extracting a triangulated mesh surface representation from said 3-D volumetric image data, wherein each vertex $p_i$ of said mesh has a corresponding set $\{t_{i,j}\}$ of adjacent triangles of said mesh, wherein each triangle $t_{i,j}$ has a region $r_{i,j}$ closer to vertex $p_i$ than to any other vertex of $t_{i,j}$, wherein each region $r_{i,j}$ has area $R_{i,j}$, and wherein a sum of $R_{i,j}$ over all triangles adjacent to said vertex $p_i$ is given by $R_i$;

constructing an initial shape operator at each vertex of said triangulated mesh;

smoothing said initial shape operator according to an iterative weighted averaging of shape operators at vertices of said triangulated mesh to provide a smoothed shape operator;

calculating principal curvatures $k_1(p_i)$ and $k_2(p_i)$ at each vertex $p_i$ of said mesh from said smoothed shape operator, wherein $k_1(p_i) \geq k_2(p_i)$;

selecting one or two feature types of interest from the group consisting of local minimum of surface elevation and local maximum of surface elevation;

marking each vertex having principal curvatures consistent with said selected feature types according to feature type;

clustering vertices marked as having the same feature type by adjacency on said triangulated mesh to provide a set of candidate patches;

computing a feature score for each of said candidate patches;

providing said feature scores as output.

2. The method of claim 1, wherein relative weights for an lth iteration of said iterative weighted averaging of shape operators are proportional to $$w_{ij,l} = R_j(N_i \cdot N_j) \frac{\exp(-\|p_i - p_j\|^2 / 2\sigma_l^2)}{\sigma_l^2},$$

wherein $N_i$ is a surface normal at $p_i$, and wherein $\sigma_l$ is a smoothing parameter that increases from one iteration to the next.

3. The method of claim 2, wherein said iterative weighted averaging of shape operators is performed according to $$\sigma_{l+1} = 1.1\sigma_l$$

$$S_{i,l+1} = S_{i,l} + \frac{\sum_j w_{ij,l} S_{j,l}}{\sum_j w_{ij,l}}.$$

wherein $S_{i,l}$ is the smoothed shape operator at vertex $p_i$ at the lth iteration, wherein the sum on j runs over vertices adjacent to vertex $p_i$, and wherein said smoothed shape operators are represented in a single consistent coordinate system prior to computing $S_{i,l+1}$.

4. The method of claim 3, wherein said iterative weighted averaging of shape operators is initialized by setting $\sigma_0$ about equal to 0.05 mm and by setting $S_{i,0}$ equal to said initial shape operator at each vertex of said mesh, and wherein said iterative weighted averaging of shape operators is terminated when $\sigma_l$ is greater than about 0.5 mm.

5. The method of claim 1, wherein said feature type of interest is a local maximum of surface elevation, and wherein said principal curvatures are consistent with said feature type of interest if both principal curvatures are less than zero.

6. The method of claim 5, wherein said peak score is computed according to $$G(P) = \left(\sum_{p_i \in P} K_i R_i\right)\left(\min_{p_i \in P} k_2(p_i)\right),$$

wherein P is a set of vertices in one of said candidate patches and $K_i = k_1(p_i)k_2(p_i)$ is the Gaussian curvature at $p_i$.

7. The method of claim 1, wherein said constructing an initial shape operator on said triangulated mesh comprises:

at each vertex of said mesh, computing a vertex normal as a weighted average of surface normals of triangles adjacent to each said vertex;

at each triangle of said mesh, computing a triangle shape operator from said vertex normals of vertices of each said triangle;

at each said vertex, computing a vertex shape operator as a weighted average of triangle shape operators of triangles adjacent to each said vertex;

wherein said computing a vertex shape operator further comprises referring said triangle shape operators of triangles adjacent to each said vertex to a single consistent coordinate system prior to computing said weighted average of triangle shape operators.

8. The method of claim 7, wherein relative weights for said weighted average of surface normals are proportional to the area of $t_{i,j}$ divided by the squares of the lengths of the two edges of $t_{i,j}$ that touch vertex $p_i$.

9. The method of claim 7, wherein said computing a triangle shape operator comprises solving an over-determined set of linear equations by least squares.

10. The method of claim 7, wherein relative weights for said weighted average of triangle curvatures are proportional to $R_{i,j}$.

11. The method of claim 1, wherein said 3-D volumetric image data comprises voxelized computed tomographic data.

12. The method of claim 11, wherein said computed tomographic data comprises a colon image, and wherein said surface features being recognized comprises colon polyp features.

13. The method of claim 1, wherein said extracting a surface representation is performed according to a marching cubes algorithm.

14. The method of claim 1, wherein said calculating principal curvatures at each vertex comprises calculating an eigenvalue decomposition of said smoothed shape operator at each vertex.

* * * * *